(12) United States Patent
Pitsch et al.

(10) Patent No.: US 11,351,711 B2
(45) Date of Patent: Jun. 7, 2022

(54) DIE WITH A MODULAR ADJUSTMENT SYSTEM AND A MODULAR ADJUSTMENT SYSTEM

(71) Applicant: NORDSON CORPORATION, Westlake, OH (US)

(72) Inventors: Dale Pitsch, Jim Falls, WI (US); Mike Dudley, Chippewa Falls, WI (US); Kerry Reetz, Fall Creek, WI (US)

(73) Assignee: Nordson Corporation, Westlake, OH (US)

( * ) Notice: Subject to any disclaimer, the term of this patent is extended or adjusted under 35 U.S.C. 154(b) by 781 days.

(21) Appl. No.: 16/122,591

(22) Filed: Sep. 5, 2018

(65) Prior Publication Data

US 2019/0091913 A1 Mar. 28, 2019

Related U.S. Application Data

(60) Provisional application No. 62/565,091, filed on Sep. 28, 2017.

(51) Int. Cl.
*B29C 48/25* (2019.01)
*B29C 48/30* (2019.01)
(Continued)

(52) U.S. Cl.
CPC .............. *B29C 48/30* (2019.02); *B29C 48/08* (2019.02); *B29C 48/2528* (2019.02);
(Continued)

(58) Field of Classification Search
None
See application file for complete search history.

(56) References Cited

U.S. PATENT DOCUMENTS

| 5,626,888 A | 5/1997 | Saenze et al. |
| 5,770,129 A * | 6/1998 | Monti ..................... B29C 48/31 |
| | | 264/40.1 |
| 2016/0243745 A1* | 8/2016 | Iuliano ................ B29C 48/3001 |

FOREIGN PATENT DOCUMENTS

| CN | 201613607 U | 10/2010 |
| CN | 104552868 A | 4/2015 |
| DE | 102013220484 A1 | 4/2015 |

OTHER PUBLICATIONS

ISA/220—Notification of Transmittal of Search Report and Written Opinion of the ISA, or the Declaration dated Jan. 16, 2019 for WO Application No. PCT/US18/053005.

* cited by examiner

*Primary Examiner* — Monica A Huson
*Assistant Examiner* — Kelsey C Grace
(74) *Attorney, Agent, or Firm* — BakerHostetler

(57) ABSTRACT

An adjustment system coupled to a die, and a die including an adjustment system, includes first and second adjustment modules. The first adjustment module includes a first body, a first plurality of studs, and a first actuator. Each of the first plurality of studs is slidably positioned within the first body. The first actuator is coupled to the first plurality of studs and is configured to move each of the first plurality of studs. The second adjustment module includes a second body, a second plurality of studs, and a second actuator. Each of the second plurality of studs is slidably positioned within the second body. The second actuator is coupled to the second plurality of studs and is configured to move each of the second plurality of studs. The number of studs composing the first plurality of studs is different from a number of studs composing the second plurality of studs.

11 Claims, 6 Drawing Sheets

(51) Int. Cl.
*B29C 48/31* (2019.01)
*B29C 48/08* (2019.01)
(52) U.S. Cl.
CPC ...... *B29C 48/2562* (2019.02); *B29C 48/2566* (2019.02); *B29C 48/313* (2019.02); *B29C 2948/92152* (2019.02); *B29C 2948/92647* (2019.02)

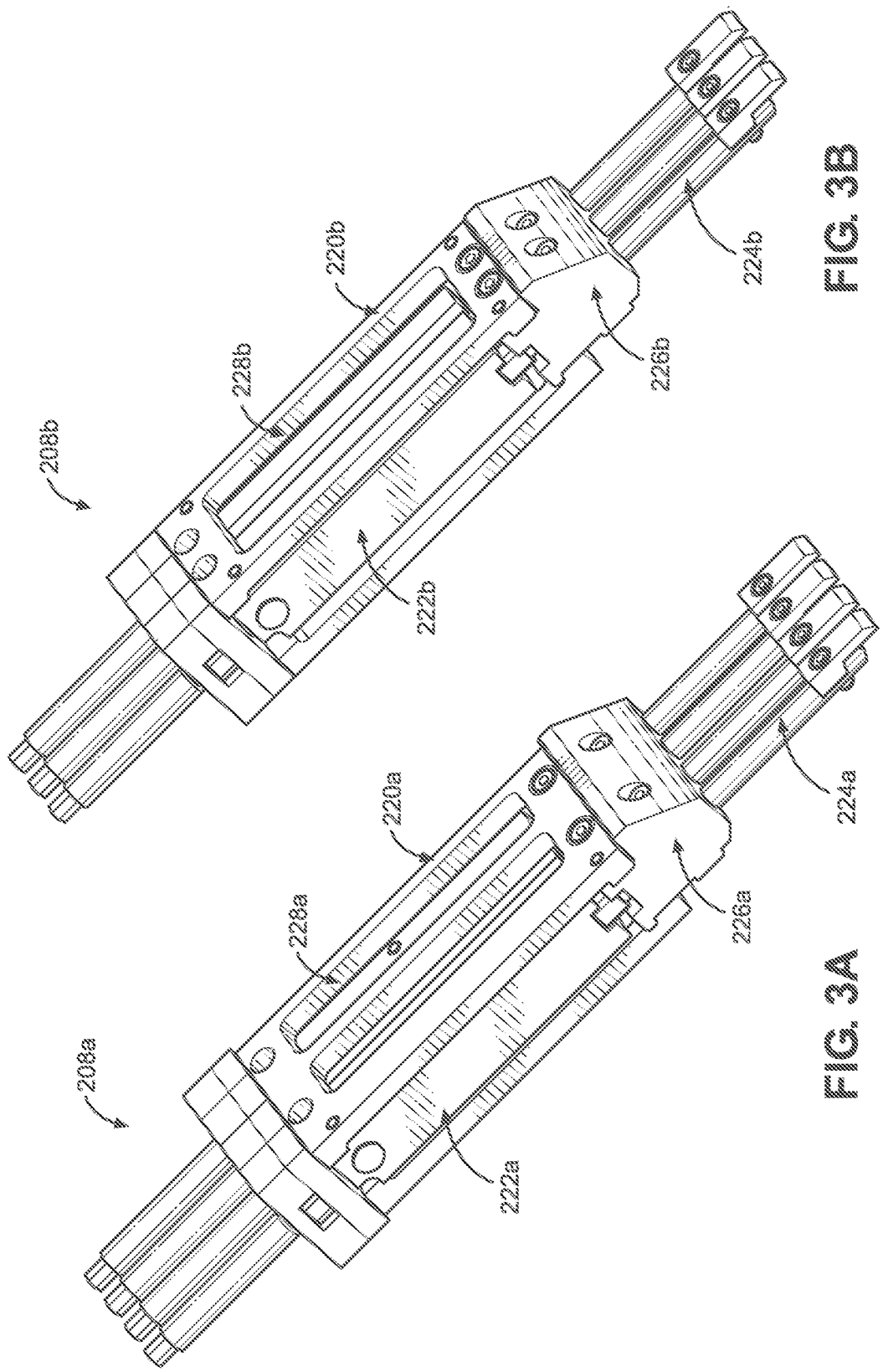

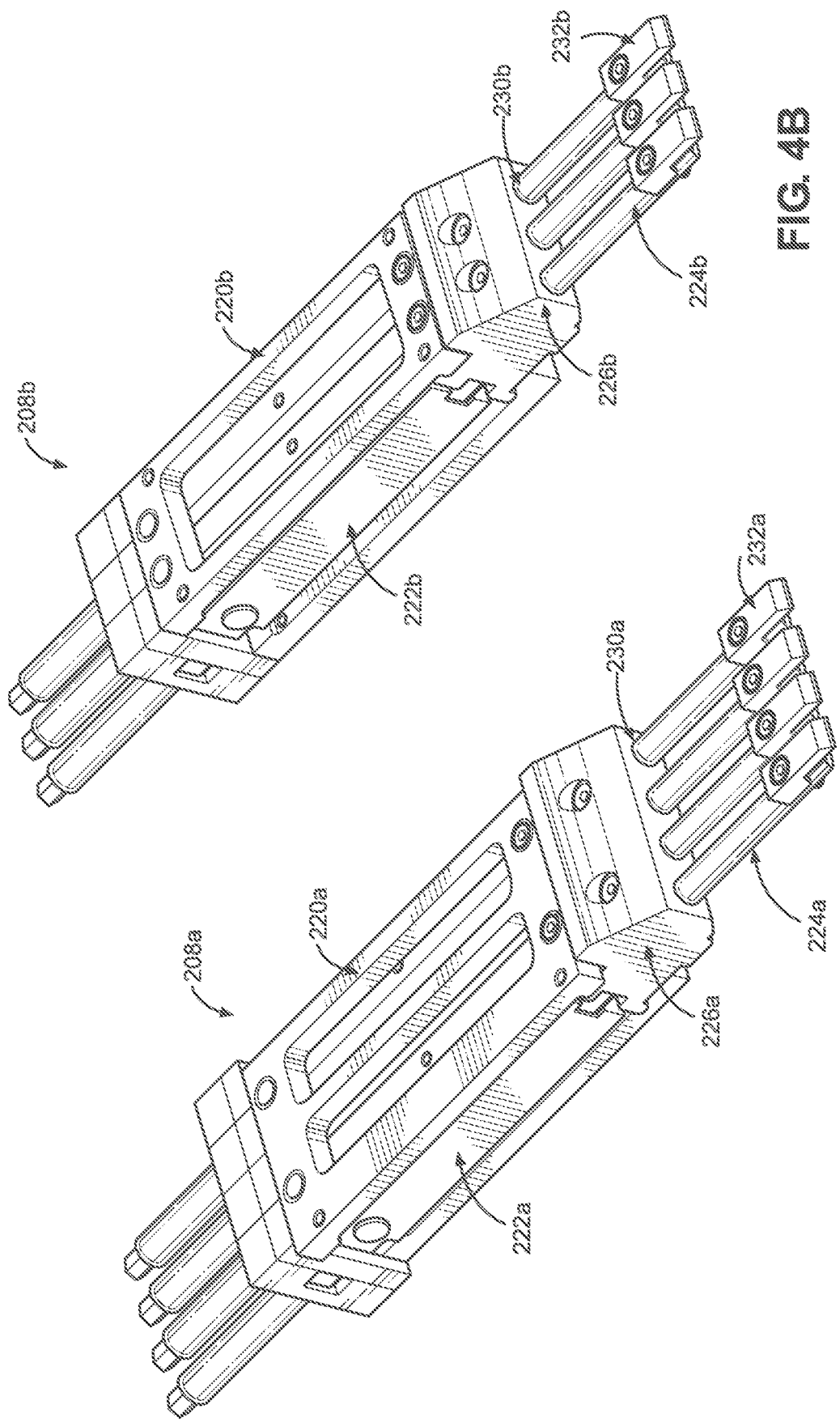

DIE WITH A MODULAR ADJUSTMENT SYSTEM AND A MODULAR ADJUSTMENT SYSTEM

CROSS REFERENCE TO RELATED APPLICATIONS

This application claims the benefit of U.S. Provisional Patent App. No. 62/565,091, filed Sep. 28, 2017, the disclosure of which is hereby incorporated by reference herein.

TECHNICAL FIELD

The present disclosure relates to dies, and more particularly, to a die with a modular adjustment system that adjusts fluid distribution across the die using adjustment modules.

BACKGROUND

Dies are used for discharging molten polymers, fluids, slurries, or other substances. Dies deliver at least one layer of a substance by forcing the substance out of a reservoir through a die outlet. The extrudate is then fed to a roll stack, a substrate, or other receiving element.

To change the distribution of the substance being discharged from the die, the shape of the die outlet can be adjusted through the use of an adjuster. In conventional systems, the adjuster includes a single body with a plurality of adjuster studs mounted to the body. The adjuster is mounted to the die and each of the adjuster studs is positioned along the die outlet. The adjuster studs are moved to adjust a size of the die outlet. When the adjuster needs maintenance or repair, the adjuster is removed from the die, maintained and repaired, and replaced back on the die. The removal and replacement process can require overhead cranes or a hoist to handle the adjuster, and often requires significant down time.

Therefore, there is a need for an improved adjuster for adjusting the distribution of a substance being discharged from a die to minimize inessential equipment and system down time.

SUMMARY

Disclosed herein is a die for dispensing a substance that includes a modular adjustment system and a modular adjustment system to retrofit existing adjustment systems. The modular adjustment system includes a plurality of adjustment modules, each of which has adjustment studs. When compared to a full length adjustment system with many adjuster studs mounted to a single body, the adjustment modules are light weight, easier to handle, and require less down time to remove and replace, resulting in an adjustment system that is safe to repair and maintain.

The adjustment system includes a first adjustment module and a second adjustment module. The first adjustment module includes a first body, a first plurality of studs, and a first actuator. Each of the first plurality of studs is slidably positioned within the first body. The first actuator is coupled to the first plurality of studs and is configured to move each of the first plurality of studs. The second adjustment module includes a second body, a second plurality of studs, and a second actuator. Each of the second plurality of studs is slidably positioned within the second body. The second actuator is coupled to the second plurality of studs and is configured to move each of the second plurality of studs. The number of studs composing the first plurality of studs is different from a number of studs composing the second plurality of studs.

Another aspect of the present disclosure provides a die for discharging a substance. The die includes an adjustment system coupled to the die. The adjustment system includes a first adjustment module including a first body, a first plurality of studs, where each of said first plurality of studs is slidably positioned within said first body, and a first actuator coupled to said first plurality of studs, where said first actuator being configured to move each of said first plurality of studs. The adjustment system also includes a second adjustment module including a second body, a second plurality of studs, where each of said second plurality of studs is slidably positioned within said second body, and a second actuator coupled to said second plurality of studs, where said second actuator being configured to move each of said second plurality of studs. The die also includes a number of studs composing said first plurality of studs that is different than a number of studs composing said second plurality of studs.

Another aspect of the present disclosure provides a method for repairing a die. The method includes removing the first adjustment module from the die and mounting a replacement adjustment module to the die. The replacement adjustment module has a third plurality of studs, where a number of studs composing the first plurality of studs is the same as a number of studs composing the third plurality of studs, and where the number of studs composing the first plurality of studs is different from a number of studs composing the second plurality of studs.

This Summary is provided to introduce a selection of concepts that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein:

FIG. 3A illustrates a perspective view of a first adjustment module.

FIG. 3B illustrates a perspective view of a second adjustment module.

FIG. 4A illustrates a bottom perspective view of the first adjustment module shown in FIG. 3A.

FIG. 4B illustrates a bottom perspective view of the second adjustment module shown in FIG. 3B.

DETAILED DESCRIPTION

An adjustment system for controlling a thickness profile of a film or sheet being discharged from a die is described. Unlike prior systems, the adjustment system described herein provides automatic lip adjustment producing higher quality and more accurate products, which can generate substantial raw material savings compared to conventional manual systems. The adjustment system also includes module sets, each containing multiple adjustments, allowing for easy access to wearable parts in specific areas of the die.

Figure 1:
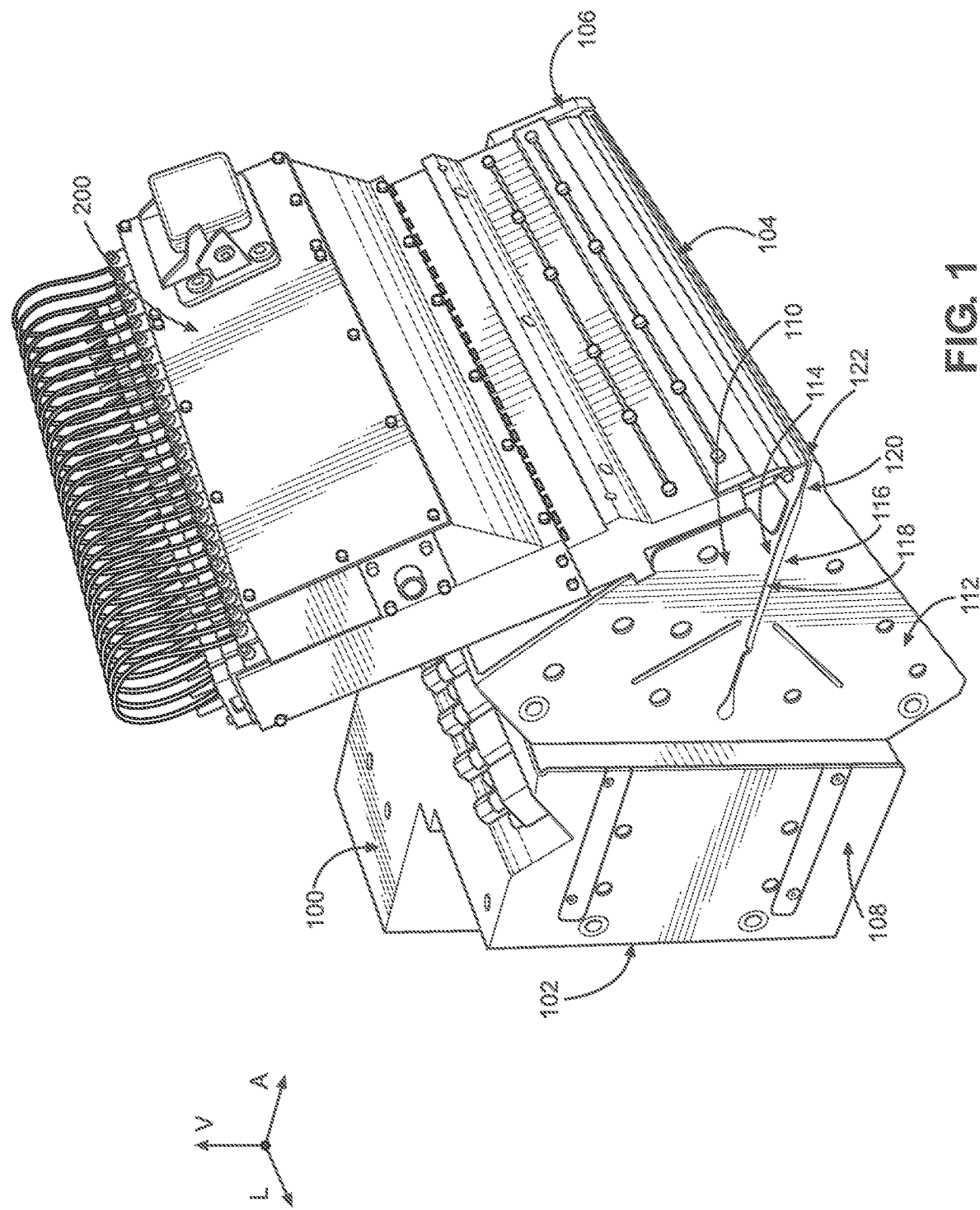
FIG. 1 illustrates a front perspective view of a die.

FIG. 1 provides a front perspective view of a die 100 with an adjustment system 200 coupled thereto. It will be appreciated that the die 100 may include extrusion dies, slot dies, molding dies, or still other types of dies. The die 100 includes a back (e.g. entrance) end 102, a front (e.g. dispensing) end 104 spaced from the back end 102 in an axial or flow direction A, a first end 106 (e.g. right side), and a second end 108 (e.g. left side) spaced from the first end 106 in a longitudinal direction L. The dispensing end 104 is configured to discharge a substance to a receiving element. The substance may include fluids, molten polymer blends, and the like. The die 100 may be supported by a base, floor mount, table top, or other support structure (not shown) to align the die 100 with a roll stack, substrate, or other receiving element. In an aspect, the receiving element may be positioned adjacent to the dispensing end 104 during an application of the substance onto the receiving element.

Certain terminology is used in the description for convenience only and is not limiting. The words "axial," "longitudinal," "left," "right," "upward," "downward," "back," "front," "top," and "bottom" designate directions in the drawings to which reference is made. The term "substantially" is intended to mean considerable in extent or largely but not necessarily wholly that which is specified. The terminology includes the above-listed words, derivatives thereof and words of similar import.

The die 100 includes an upper body member 110 and a lower body member 112. It will be appreciated that the die 100 may include other components including, for example, a left and right end plates, internal studs, a tuning assembly, a restrictor member or bar, a deckle system, or still other components. The upper body member 110 and the lower body member 112 are preferably manufactured from alloy tool steel with the flow surfaces being hard chrome-plated. Alternatively, the upper body member 110 and the lower body member 112 may be manufactured from special alloys or other material having a high dimensional stability. It will be appreciated that the die 100 may include more body members, such as a center body member (e.g., dual layer dies) or multiple center body members (e.g., triple layer dies) configured to provide fluid with two or more layers.

The upper body member 110 extends in the longitudinal direction L from the first end 106 to the second end 108 of the die 100. The upper body member 110 includes an upper surface 114. The upper body member 110 may also include, for example, a tuning channel, a restrictor channel, stud channels, an upper entry channel, an upper port channel, a distribution chamber or other channels or chambers formed within.

The lower body member 112 extends in the longitudinal direction L from the first end 106 to the second end 108 of the die 100. The lower body member 112 includes a lower surface 116. The lower body member 112 may also include channels or chambers similar to the upper body member 110 that are formed within.

The lower body member 112 is positioned adjacent to the upper body member 110 in a vertical direction V. The vertical direction V is substantially perpendicular to the longitudinal direction L. The upper surface 114 of the upper body member 110 confronts the lower surface 116 of the lower body member 112 forming an entry channel 118 and a land channel 120 therebetween. The upper surface 114 and the lower surface 116 may also form other channels therebetween, including, for example, port channels, additional preland channels, or still other channels. The entry channel 118 may also be referred to as a "distribution chamber" or "distribution channel." A port channel (not visible in figures) may extend from the back end 102 of the die 100 to the entry channel 118. The land channel 120 extends from the entry channel 118 to a die outlet 122. The port channel, the entry channel 118, and the land channel 120 are in fluid communication with one another such that the back end 102 of the die 100 is in fluid commutation with the die outlet 122 at the dispensing end 104.

Figure 2A:
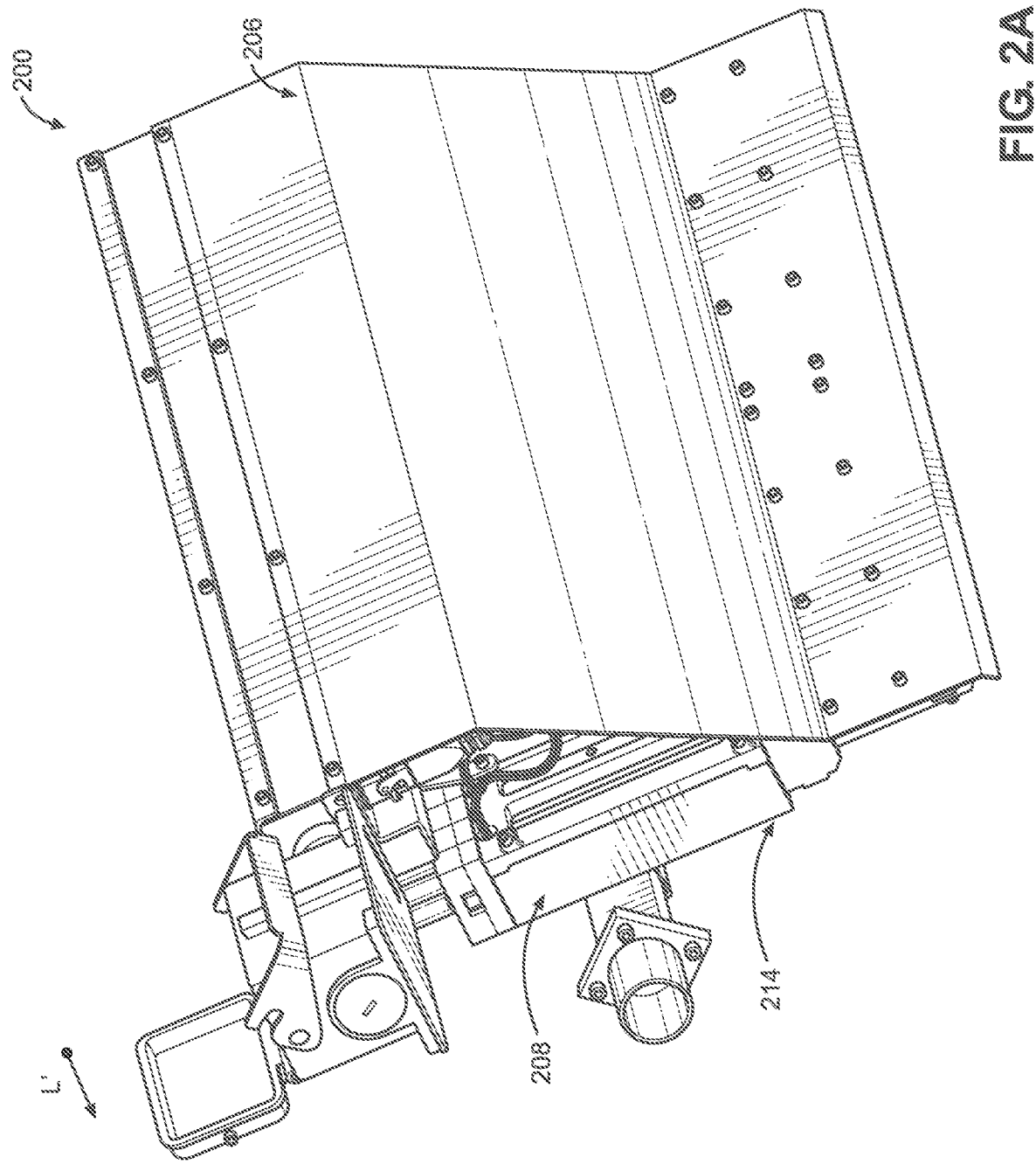
FIG. 2A illustrates a perspective view of an adjustment system.
Figure 2B:
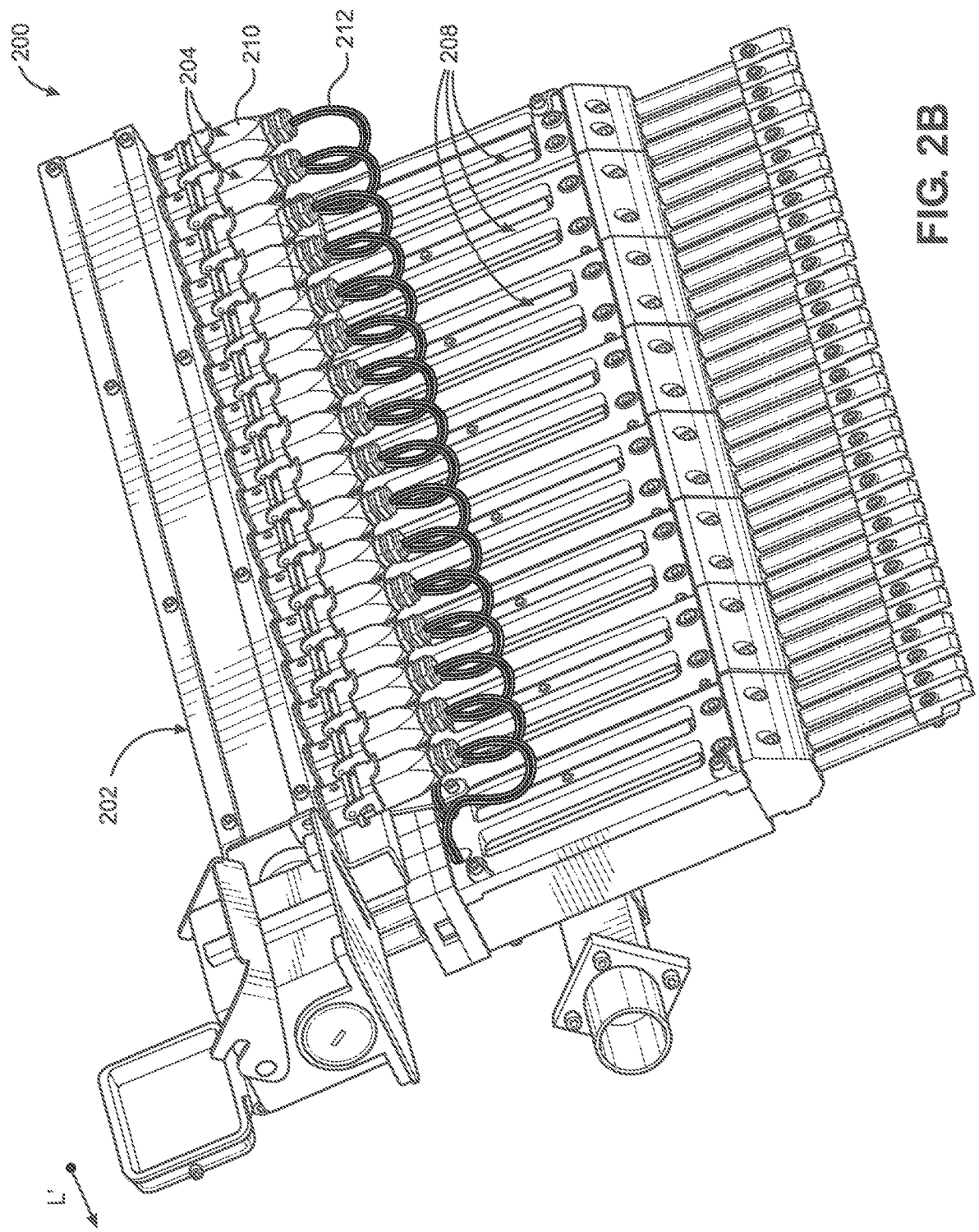
FIG. 2B illustrates a perspective view of the adjustment system shown in FIG. 2A with a cover removed.
Figure 5:
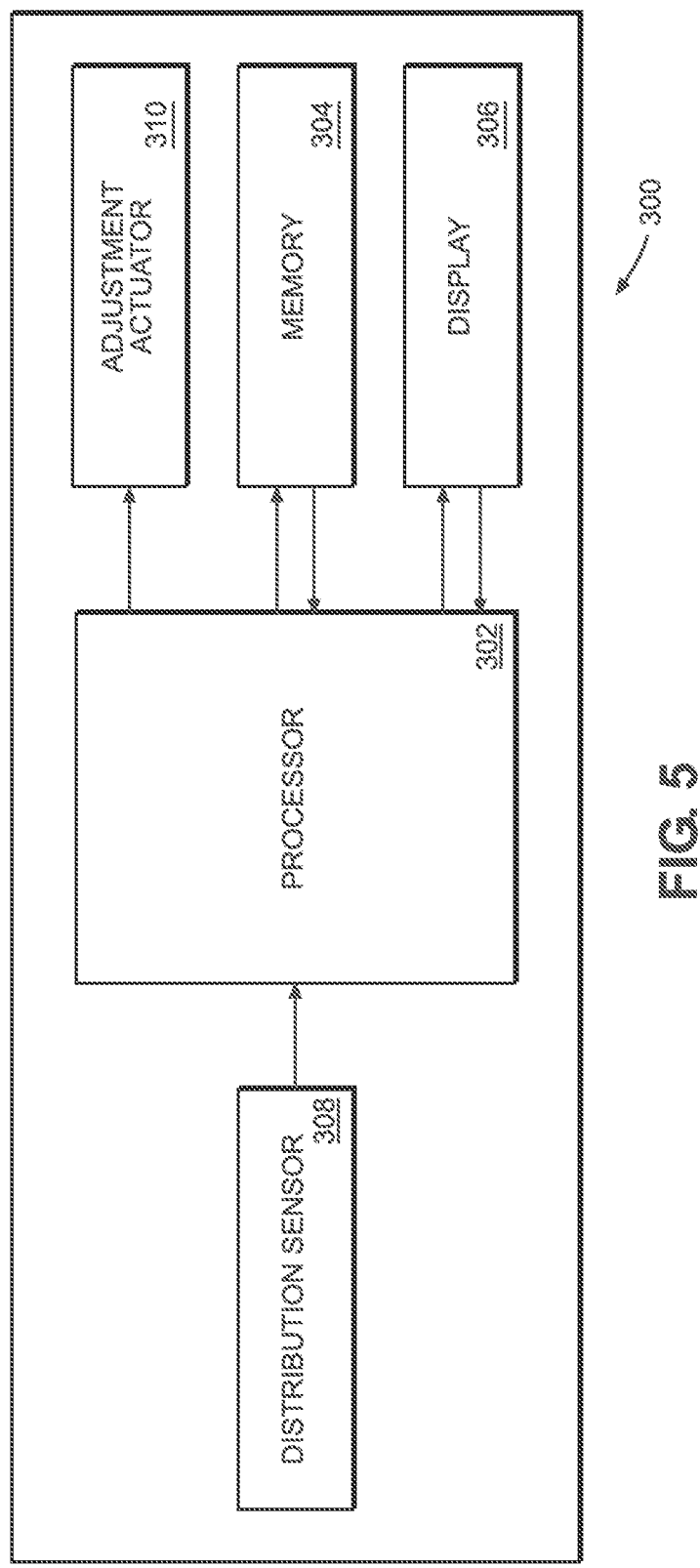
FIG. 5 illustrates a schematic of a controller.

FIGS. 2A and 2B illustrate perspective views of the adjustment system 200, according to aspects of this disclosure. The adjustment system 200 includes a junction box 202 (e.g. electrical box), wiring assemblies 204, a guard 206, and adjustment modules 208. The adjustment system 200 may be coupled to the die 100 as a single unit, or alternatively, the components of the adjustment system 200 may be coupled to the die 100 individually. The adjustment system 200 may be configured to be retrofitted for coupling to existing dies.

The junction box 202 contains electric wires and cables adapted to provide power to the adjustment modules 208. The junction box 202 is in the form of an enclosure to protect electrical connections and provide a safety barrier. The junction box 202 includes several outlets (not visible in figures) for receiving power plugs 210.

Each of the wiring assemblies 204 includes plug 210 and a cable 212. The plugs 210 are configured for insertion into the outlets in the junction box 202, and the cables 212 are electrically coupled to the adjustment modules 208. Connecting the plugs 210 to the junction box 202 provides an electrical connection between the junction box 202 and the adjustment modules 208. In an aspect, each adjustment module is configured to include two wiring assemblies 204.

The guard 206 is adapted to couple to the junction box 202 via, for example, bolts, screws, or other coupling means. The guard 206 extends over a top side of the adjustment modules 208, and is configured to protect the adjustment modules 208 during operation of the die 100. The guard 206 is also adapted to couple to the adjustment modules 208 to further secure the guard 206 to the adjustment system 200. The guard 206 may prevent debris from contacting the adjustment modules 208 or may prevent other unintended contact with the adjustment modules 208.

The adjustment modules 208 are configured to be positioned along a longitudinal direction L' of the adjustment system 200. Each adjustment module 208 may be positioned adjacent to each other adjustment module 208 along the longitudinal direction L'. The adjustment modules 208 may be coupled to a support plate 214 extending in the longitudinal direction L' along a bottom side of the adjustment modules 208.

FIGS. 3A and 3B are perspective views of two aspects of the adjustment modules 208. FIG. 3A illustrates a first adjustment module 208a, and FIG. 3B illustrates a second adjustment module 208b. Each adjustment module 208a,b includes a respective body 220a,b, an actuator 222a,b, a plurality of studs 224a,b, and a mounting bar 226a,b. As further described herein, reference to "a" refers to components of the first adjustment module 208a, and reference to "b" reference to components of the second adjustment module 208b.

Each body 220a,b includes a stud channel 228a,b formed within. Each stud channel 228a,b extends through each adjustment module 208a,b from a top end to a bottom end, and is configured to slidably receive the plurality of studs 224a,b. In an aspect, each body 220a,b may include a plurality of stud channels 228a,b formed within, each of the plurality of stud channels 228a,b configured to slidably receive a respective one of the plurality of studs 224a,b. For example, the first adjustment module 208a may include four stud channels 228a, each of the four stud channels 228a is configured to receive a respective stud 224a.

Each actuator 222a,b is positioned at least partially within each respective body 220a,b. Each actuator 222a,b is coupled to the plurality of studs 224a,b extending through each respective body 220a,b, and is configured to move each of the plurality of studs 224a,b. For example, actuator 222a may actuate the plurality of studs 224a to move from the top end to the bottom end of the first adjustment module 208a, and from the bottom end to the top end of each adjustment module 208a. In an aspect, each adjustment module 208a,b may include an actuator 222a,b for each of the plurality of studs 224a,b that extends through the respective body 220a, b. For example, if the first adjustment module 208a includes four studs 224a, the first adjustment module 208a may include four actuators 222a, one for each stud 224a.

The actuators 222a,b may comprise electric actuators, mechanical actuators, thermal actuators, or still other types of actuators. In a preferred aspect, each actuator 222a,b comprises a thermal actuator (e.g. heating unit). The thermal actuators may include non-electric motors and pistons that produce linear motion upon temperature change. Upon temperature increase, thermal sensitive material inside the thermal actuator expands pushing the piston to a desired length. Upon temperature decrease, the thermal sensitive material inside the thermal actuator contracts or shrinks, providing space for the piston to return.

FIGS. 4A and 4B illustrate bottom perspective views of the first and second adjustment module 208a and 208b. Each mounting bar 226a,b is coupled to a bottom end of the body 220a,b of the respective adjustment module 208a,b. Each mounting bar 226a,b is configured to removably mount to the die 100 by, for example, a pair of bolts, screws, or other component configured to secure each mounting bar 226a,b to the die 100. Each mounting bar 226a,b includes a plurality of holes 230a,b extending therethrough. Each of the plurality of holes 230a,b is configured to receive the respective plurality of studs 224a,b within. For example, if the first adjustment module 208a includes four studs 224a, the mounting bar 226a includes four holes 230a configured to receive each of the four studs 224a.

Each of the adjustment modules 208a,b further includes a plurality of lip connectors 232a,b. Each of the lip connectors 232a,b is configured to couple to a bottom end of the plurality of studs 224a,b. For example, if the plurality of studs 224a of the first adjustment module 208a includes four studs, then each of the four studs would include a lip connector 232a coupled towards the bottom end. The plurality of lip connectors 232a,b are configured to couple the plurality of studs 224a,b to the dispensing end 104 of the die 100.

In an aspect, the first plurality of studs 224a of the first adjustment module 208a includes four studs 224a, and the second plurality of studs 224b of the second adjustment module 208b includes three studs. It will be appreciated that each of the adjustment modules 208a,b may include fewer or more studs. In a preferred aspect, the adjustment system 200 includes at least one first adjustment module 208a and at least one second adjustment module 208b. For example, the adjustment system 200 may include five first adjustment modules 208a aligned along the longitudinal direction L', and one second adjustment module 208b aligned along the longitudinal direction L'. In this example, there would be 23 studs incorporated into the adjustment system 200 (5 first modules times 4 studs, plus 1 second module times 3 studs). In another example, the adjustment system 200 may include three first adjustment modules 208a and three second adjustment modules 208b. This would result in 21 studs incorporated into the adjustment system 200 (3 first modules times 4 studs, plus 3 second module times 3 studs).

A method for using the adjustment system 200 to control the distribution of a substance being dispensed through the die outlet 122 commences by mounting the adjustment system 200 to the upper body member 110 of the die 100. The adjustment system 200 may be mounted as a single unit, or each individual adjustment module 208a,b may be mounted separately. When the adjustment system 200 is mounted, the longitudinal direction L' of the adjustment system 200 is substantially parallel to the longitudinal direction L of the die 100. Each of the lip connectors 232a,b is coupled to the upper body member 110 at the dispensing end 104 of the die 100.

After the adjustment system 200 is mounted to the die 100, the substance may be provided to the back end 102 of the die 100 and through the port channel, the entry channel 118, and the land channel 120. One of more extruders (not shown) may be used to feed the entrance of the port channel to deliver a precise volume of substance into the port channel. The fluid is distributed longitudinally as it enters into and fills the entry channel 118. As the fluid flow exits the entry channel 118, a height of the fluid (e.g. fluid height in the vertical direction V) is reduced and the fluid flows into the land channel 120. The height of the land channel 120 is adjusted by the adjustment modules 208a,b of the adjustment system 200 to control the thickness profile through the land channel 120 and out the die outlet 122 along the longitudinal direction L. Each actuator 222a,b controls each of the plurality of studs 224a,b to increase and decrease the height of the substance exiting through the die outlet 122. Each actuator 222a,b may be controlled manually or automatically, as further described below.

If a component in the adjustment modules 208a,b malfunctions, the individual adjustment module 208a,b may be removed and replaced with a new module (e.g. replacement adjustment module). The replacement module includes the same number of studs as the number of studs on the adjustment module 208a,b being removed and replaced. The guard 206 is removed from the adjustment system 200 to access the malfunctioning adjustment module 208a,b. The adjustment module 208a,b is unplugged from the junction box 202, and the adjustment module 208a,b is removed from the die 100 (e.g. remove securing bolts). The replacement module is then mounted to the die 100 and plugged into the junction box 202 to form an electrical connection between the junction box 202 and the replacement module. The lip connectors 232a,b are coupled to the dispensing end 104 of the die 100. The guard 206 is then coupled to the junction box 202 to protect the adjustment modules. After replacement of the replacement module, operation of the die 100 continues. In an aspect, instead of replacing the malfunctioning adjustment module 208a,b, the adjustment module 208a,b may be removed, repaired, and mounted back to its original location on the die 100.

FIG. 4 illustrates a controller 300, such as an electronic control unit, which may be used to facilitate control and coordination of the die 100. In this embodiment, the controller 300 comprises each sensor 308 and actuator 310 located within the disclosed die 100. Additionally, the controller 300 includes a processor 302, memory 304, and a display 306. While the controller 300 is represented as a single unit, in other aspects the controller 300 may be distributed as a plurality of distinct but interoperating units, incorporated into another component, or located at different locations on or off the die 100. The controller 300 may be configured to automatically control the thickness profile of the substance exiting the die 100 through the die outlet 122, as described in more detail below.

A flow distribution sensor 308 may be coupled to the die 100 adjacent to or near to the die outlet 122. The flow distribution sensor 308 may sense the thickness profile (e.g. flow distribution) of the substance being discharged through the die outlet 122. The thickness profile includes a height of the substance at locations spaced along the die outlet 122 in the longitudinal direction L. In an aspect, the flow distribution sensor 308 may comprise a plurality of sensors, each of which may be aligned along the die outlet 122.

The processor 302 may be coupled to each of the sensors 308 and actuators 222*a,b* operatively coupled to the die 100. The processor 302 may be configured to output signals that are responsive to inputs from the flow distribution sensor 308 and to control the adjustment modules 208 of the adjustment system 200 through the actuators 222*a,b*, as described above. The display 306 may also be coupled to the processor 302 to display various data to an operator relating to, for example, the distribution of the substance exiting the die 100 through the die outlet 122. Action may be taken in response to the data, including modifying flow distribution of the substance exiting the die 100 to maintain a desired thickness profile.

The processor 302 utilizes the values sensed by the sensor 308 that may be stored in computer readable memory 304 to compare the sensed thickness profile to a desired thickness profile stored in the memory 304. The desired thickness profile may be input into the controller 300 by an input device (not shown). If the sensed thickness profile differs from the desired thickness profile by a maximum threshold stored in memory 304, or if the sensed thickness profile is outside of an acceptable range of the desired thickness profile, the processor 302 may send signals to the actuators 222*a,b* to adjust the flow distribution accordingly. If the sensed thickness profile has not reached the maximum threshold, then the processor 302 may or may not send signals to actuators 222*a,b* adjusting the flow distribution. In either case the processor 302 may also send signals to the display 306 indicating whether the thickness profile has exceeded or has yet to exceed the maximum threshold. It will be appreciated that the maximum threshold may include a plurality of thresholds, each indicating a thickness of the substance being discharged through the die outlet 122 along the longitudinal direction L.

The computer readable memory 304 may include random access memory (RAM) and/or read-only memory (ROM). The memory 304 may store computer executable code including algorithms for adjusting the thickness profile. The memory 304 may also store various digital files including the values sensed by the sensors 308. The information stored in the memory 304 may be provided to the processor 302 so that the processor may determine the thickness profile of the substance being discharged.

These specific embodiments described above are for illustrative purposes and are not intended to limit the scope of the disclosure as otherwise described and claimed herein. Modification and variations from the described embodiments exist.

What is claimed is:

1. An adjustment system adapted for coupling to a die having a first lip and a second lip opposing the first lip that define a die outlet, the adjustment system comprising:
 a first adjustment module removably mountable to said die, the first adjustment module comprising:
  a first body,
  a first plurality of studs, each of said first plurality of studs is slidably positioned within said first body and couplable to the first lip, and
  a first actuator coupled to said first plurality of studs, said first actuator being configured to move each of said first plurality of studs; and
 a second adjustment module removably mountable to said die, the second adjustment module comprising:
  a second body,
  a second plurality of studs, each of said second plurality of studs is slidably positioned within said second body and couplable to the first lip, and
  a second actuator coupled to said second plurality of studs, said second actuator being configured to move each of said second plurality of studs,
 a number of studs composing said first plurality of studs is different than a number of studs composing said second plurality of studs.

2. The adjustment system of claim 1, wherein said first body of the first adjustment module comprises a first plurality of stud channels, wherein each of said first plurality of stud channels is configured to slidably receive a respective one of said first plurality of studs, and wherein said second body of said second adjustment module comprises a second plurality of stud channels, wherein each of said second plurality of stud channels is configured to slidably receive a respective one of said second plurality of studs.

3. The adjustment system of claim 1, wherein said first plurality of studs includes three studs, and wherein said second plurality of studs includes four studs.

4. The adjustment system of claim 1, further comprising:
 a junction box;
 a first wiring assembly configured to connect to said junction box and to said first actuator to form an electrical connection therebetween; and
 a second wiring assembly configured to connect to said junction box and to said second actuator to form an electrical connection therebetween.

5. The adjustment system of claim 4, further comprising:
 a guard configured to couple to said junction box and extend over said first and second adjustment modules.

6. The adjustment system of claim 1, wherein said first adjustment module further comprises a first mounting bar configured to removably mount to said die, the first mounting bar including a first plurality of holes extending therethrough configured to receive said first plurality of studs within, and wherein said second adjustment module further comprises a second mounting bar configured to removably mount to said die, the second mounting bar including a second plurality of holes extending therethrough configured to receive said second plurality of studs within.

7. The adjustment system of claim 1, wherein said first adjustment module further comprises a first plurality of lip connectors, each of said first plurality of lip connectors configured to couple to an end of a respective one of said first plurality of studs, and wherein said second adjustment module further comprises a second plurality of lip connectors, each of said second plurality of lip connectors configured to couple to an end of a respective one of said second plurality of studs, wherein said first and second plurality of lip connectors are further configured to couple to the first lip of said die.

8. The adjustment system of claim 1, wherein said first actuator comprises a first heating unit, and wherein said second actuator comprises a second heating unit.

9. The adjustment system of claim 1, further comprising:
a controller operatively coupled to said first actuator and said second actuator, said controller being configured to send a control command to control said first actuator or said second actuator to move said first plurality of studs or said second plurality of studs, respectively, the controller comprising:
a sensor configured to sense a thickness profile of a substance exiting said die, and
a processor configured to generate the control command based on the sensed thickness profile and a desired thickness profile.

10. The adjustment system of claim 9, wherein the processor is configured to:
compare the sensed thickness profile to the desired thickness profile;
determine, in response to the comparison of the sensed thickness profile to the desired thickness profile, that the sensed thickness profile outside of an acceptable range of the desired thickness profile; and
generate, in response to the determination that the sensed thickness profile is not within an acceptable range of the desired thickness profile, the control command to said first actuator or said second actuator to move said first plurality of studs or said second plurality of studs, respectively.

11. A die for discharging a substance, the die comprising:
an adjustment system coupled to the die, the die having a first lip and a second lip opposing the first lip that define a die outlet, the adjustment system comprising:
a first adjustment module removably mountable to said die, the first adjustment module comprising:
a first body,
a first plurality of studs, each of said first plurality of studs is slidably positioned within said first body and couplable to the first lip, and
a first actuator coupled to said first plurality of studs, said first actuator being configured to move each of said first plurality of studs; and
a second adjustment module removably mountable to said die, the second adjustment module comprising:
a second body,
a second plurality of studs, each of said second plurality of studs is slidably positioned within said second body and couplable to the first lip, and
a second actuator coupled to said second plurality of studs, said second actuator being configured to move each of said second plurality of studs,
a number of studs composing said first plurality of studs is different than a number of studs composing said second plurality of studs.

* * * * *